US012134209B2

(12) United States Patent
Smith, Jr. et al.

(10) Patent No.: US 12,134,209 B2
(45) Date of Patent: Nov. 5, 2024

(54) BULKHEAD SYSTEM FOR CONCRETE CASTING BED

(71) Applicant: Conewago Manufacturing, LLC, Hanover, PA (US)

(72) Inventors: Donald B. Smith, Jr., New Oxford, PA (US); Eric Smith, New Oxford, PA (US); John Hagarman, Hanover, PA (US); Jon Neiderer, Thomasville, PA (US); Jason Blase, York, PA (US)

(73) Assignee: Conewago Manufacturing, LLC, Hanover, PA (US)

( * ) Notice: Subject to any disclaimer, the term of this patent is extended or adjusted under 35 U.S.C. 154(b) by 175 days.

(21) Appl. No.: 17/686,653

(22) Filed: Mar. 4, 2022

(65) Prior Publication Data

US 2023/0278256 A1 Sep. 7, 2023

(51) Int. Cl.

| | |
|---|---|
| ***B28B 7/00*** | (2006.01) |
| ***B28B 1/14*** | (2006.01) |
| ***B28B 7/02*** | (2006.01) |
| ***B28B 7/24*** | (2006.01) |

(52) U.S. Cl.

CPC .............. *B28B 7/0014* (2013.01); *B28B 1/14* (2013.01); *B28B 7/02* (2013.01); *B28B 7/24* (2013.01)

(58) Field of Classification Search

CPC ........ B28B 7/0014; B28B 7/24; B28B 23/026

See application file for complete search history.

(56) References Cited

U.S. PATENT DOCUMENTS

| | | | |
|---|---|---|---|
| 3,938,776 A | | 2/1976 | Frazier |
| 4,678,156 A | | 7/1987 | Scalamandre et al. |
| 5,792,552 A | | 8/1998 | Langkamp et al. |
| 5,976,442 A | * | 11/1999 | Manning ................ B28B 11/04 249/97 |
| 6,390,440 B1 | | 5/2002 | Morin |
| 7,229,062 B1 | | 6/2007 | Rascon |
| 9,822,496 B2 | | 11/2017 | Park |
| 2007/0069104 A1 | | 3/2007 | Morin |
| 2020/0002960 A1 | | 1/2020 | Grygoruk |

FOREIGN PATENT DOCUMENTS

KR 10-2013-0047096 A 5/2013

* cited by examiner

*Primary Examiner* — James Sanders

(74) *Attorney, Agent, or Firm* — Barley Snyder

(57) ABSTRACT

A bulkhead system for a concrete casting bed includes a pair of base track members spaced apart from one another along a longitudinal direction and a pair of form walls each removably attached to one of the base track members. Each of the form walls has a lower end abutting one of the base track members and an upper end opposite the lower end in a vertical direction perpendicular to the longitudinal direction. Each of the form walls has a tendon slot extending into the form wall in the vertical direction from at least one of the upper end and the lower end. The tendon slot receives a tendon extending in the longitudinal direction.

20 Claims, 9 Drawing Sheets

BULKHEAD SYSTEM FOR CONCRETE CASTING BED

FIELD OF THE INVENTION

The present invention relates to a bulkhead system and, more particularly, to a bulkhead system for a concrete casting bed.

BACKGROUND

Concrete casting beds are commonly elongated and have at least one bulkhead installed between walls of the concrete casting bed. Multiple concrete panels can be cast along the length of the concrete casting bed; the at least one bulkhead separates sections of the bed, with one concrete panel formed in each section.

Prior to casting the panels, stressing tendons that are disposed within the cured panels are pulled along the length of the bed. Pulling the stressing tendons requires a worker to pass the tendons individually through each of the bulkheads installed on the concrete casting bed, resulting in significant labor cost and creating a safety hazard through strain or other worker injuries. Once the panels are cast, the bulkheads must be either destroyed or disassembled through manual removal of screws or bolts to strip the cast panels from the bed, further increasing the labor and material cost.

SUMMARY

A bulkhead system for a concrete casting bed includes a pair of base track members spaced apart from one another along a longitudinal direction and a pair of form walls each removably attached to one of the base track members. Each of the form walls has a lower end abutting one of the base track members and an upper end opposite the lower end in a vertical direction perpendicular to the longitudinal direction. Each of the form walls has a tendon slot extending into the form wall in the vertical direction from at least one of the upper end and the lower end. The tendon slot receives a tendon extending in the longitudinal direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
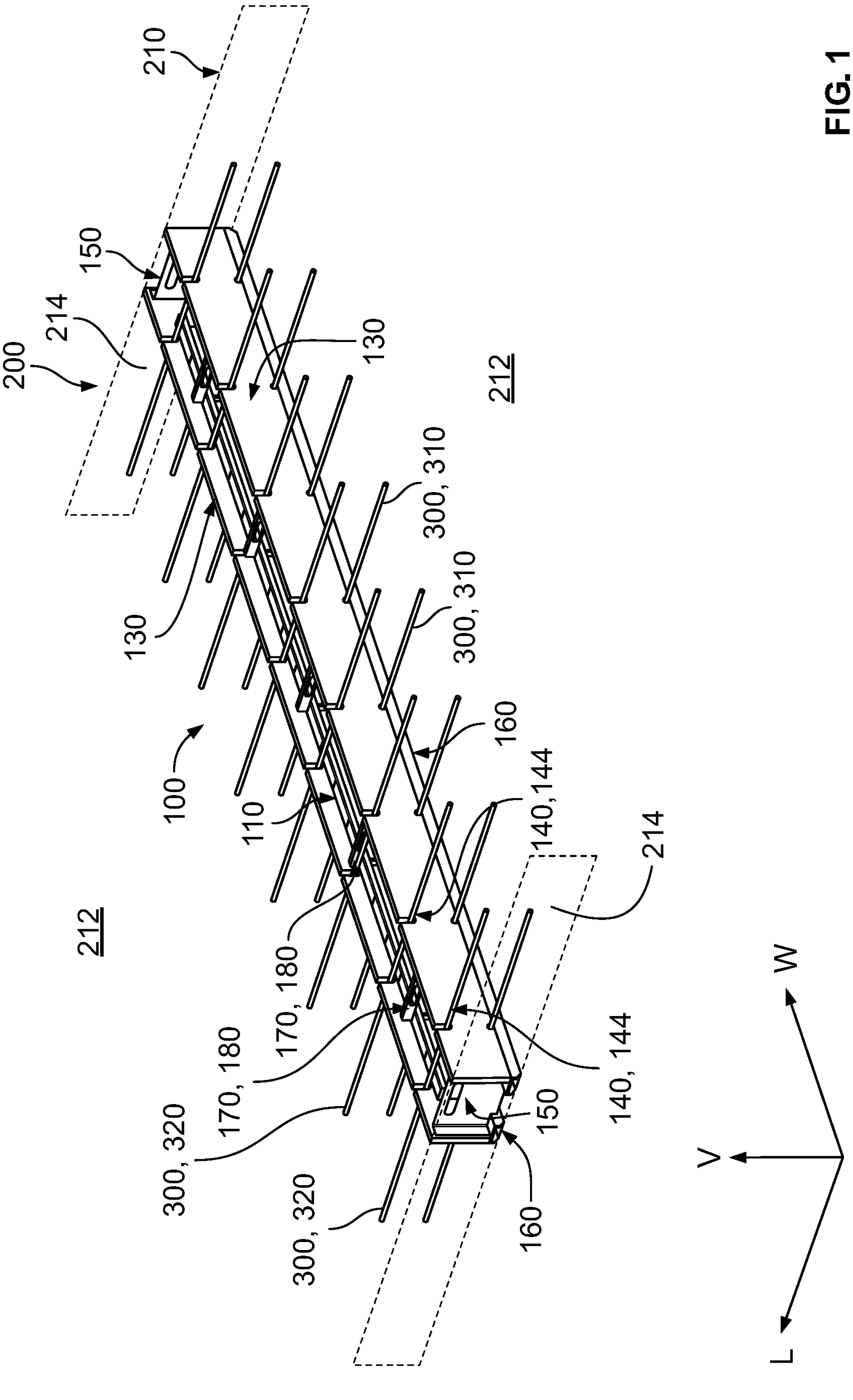
FIG. 1 is a perspective view of a bulkhead system according to an embodiment on a concrete casting bed.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "width", "vertical", and "longitudinal". These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A bulkhead system 100 according to an embodiment is shown in FIG. 1. The bulkhead system 100 can be part of a concrete casting bed assembly 200. Components of the bulkhead system 100 will be described in detail below, followed by a description of a process of using the bulkhead system 100 to form the concrete casting bed assembly 200.

Figure 2:
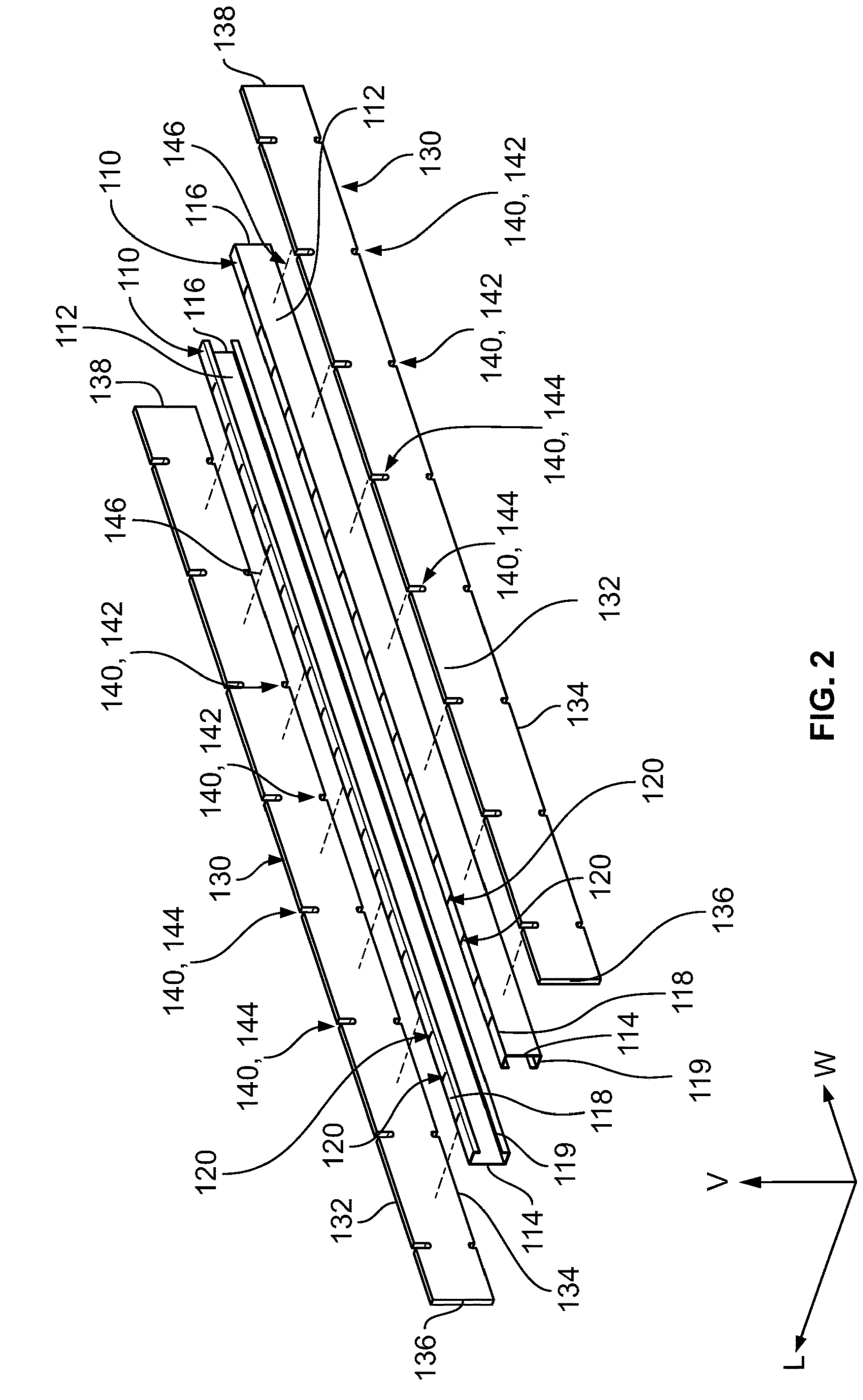
FIG. 2 is an exploded perspective view of a pair of support members and a pair of form walls of the bulkhead system.

The bulkhead system 100, as shown in FIGS. 1 and 2, includes a pair of support members 110, a pair of form walls 130 attached to the support members 110, a pair of base track members 160 to which the support members 110 and form walls 130 are attached, a plurality of keys 170 removably securing the elements of the bulkhead system 100, and a pair of end panels 150.

The support members 110, as shown in FIG. 2, each have a support body 112 extending from a first support end 114 to a second support end 116 along a width direction W. A plane defined by the support body 112 extends in the width direction W and a vertical direction V orthogonal to the width direction W. An upper support portion 118 and a lower support portion 119 extend from opposite ends of the support body 112 in the vertical direction V. Each of the upper support portion 118 and the lower support portion 119 extends, at least in part, orthogonally to the support body 112 and, at least in part, parallel to one another. In the shown embodiment, the upper support portion 118 and the lower support portion 119 are each an L-shaped element. In other embodiments, the upper support portion 118 and the lower support portion 119 may be a flat element extending in a single direction orthogonal to the support body 112.

Figure 7:
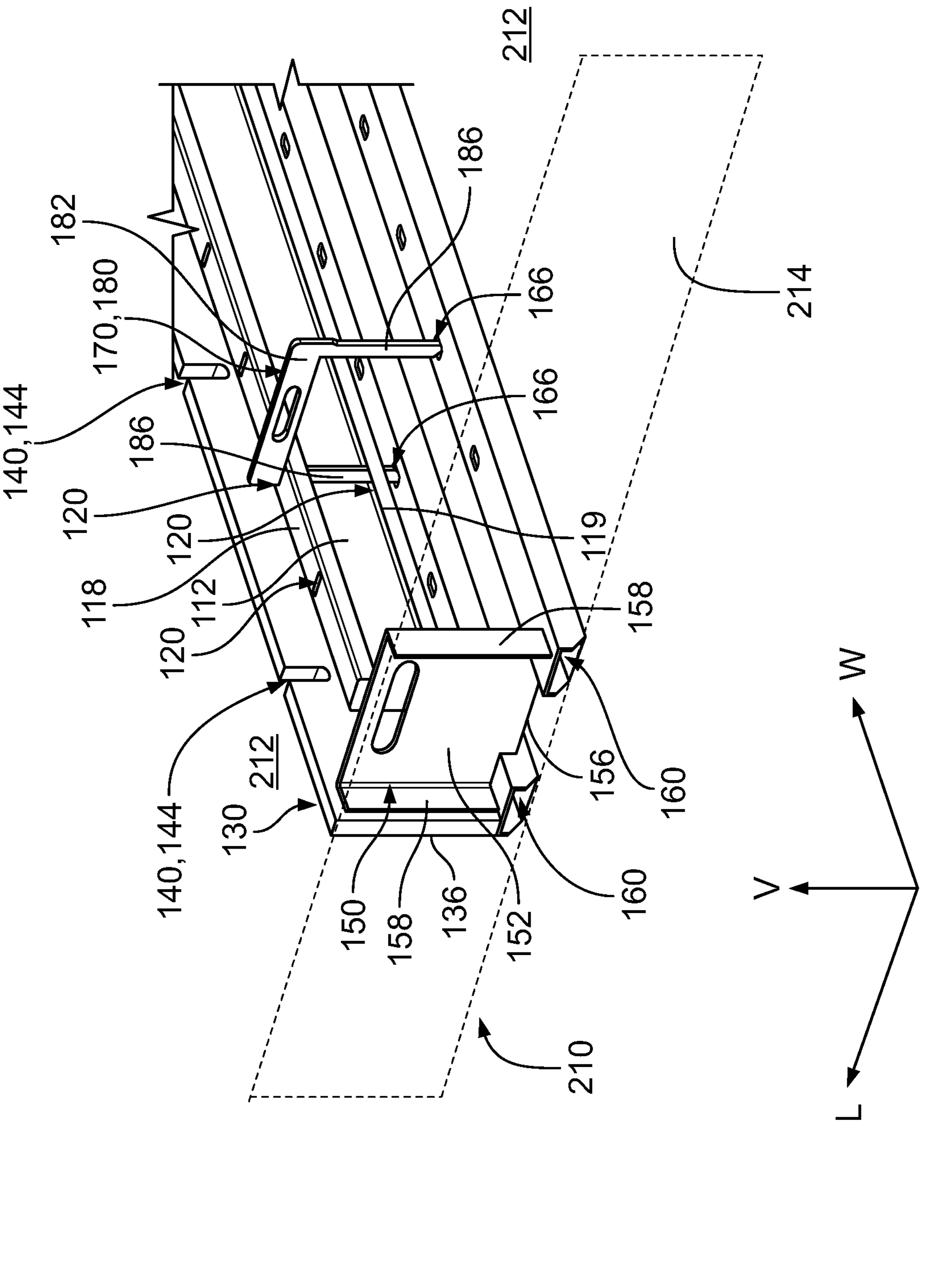
FIG. 7 is a detail perspective view of a support key of the bulkhead system inserted through a support member and into the base track members.

As shown in FIG. 2, each of the support members 110 has a plurality of support key slots 120 extending through the support member 110 in the vertical direction V. In the shown embodiment, the support key slots 120 extend through the upper support portion 118 and the lower support portion 119; the support key slots 120 in the upper support portion 118 are aligned with the support key slots 120 in the lower support portion 119 along the vertical direction V, as shown in FIG. 7. In the shown embodiments, each of the support key slots 120 has an oblong, slit-like shape. In other embodiments, the support key slots 120 may have other shapes provided they can serve the functions and receive the elements described in detail below.

The form walls 130, as shown in FIG. 2, each have an approximately rectangular shape, having an upper end 132 and a lower end 134 opposite the upper end 132 in the vertical direction V, and extending between a first form end 136 and a second form end 138 along the width direction W. A plane defined by each of the form walls 130 extends in the width direction W and the vertical direction V.

Each of the form walls 130 has a plurality of tendon slots 140 extending into the form wall 130. As shown in FIG. 2, the plurality of tendon slots 140 include a plurality of first tendon slots 142 extending into the form wall 130 in the vertical direction V from the lower end 134 and a plurality of second tendon slots 144 extending into the form wall 130 in the vertical direction V from the upper end 132. In the shown embodiment, the first tendon slots 142 are distributed evenly along the lower end 134 between the first form end 136 and the second form end 138, and the second tendon slots 144 are distributed evenly along the upper end 132 between the first form end 136 and the second form end 138. In other embodiments, the first tendon slots 142 may be distributed irregularly along the upper end 132 and the second tendon slots 144 may be distributed irregularly along the lower end 134, provided that the first tendon slots 142 are aligned with the second tendon slots 144 along the vertical direction V.

Figure 3:
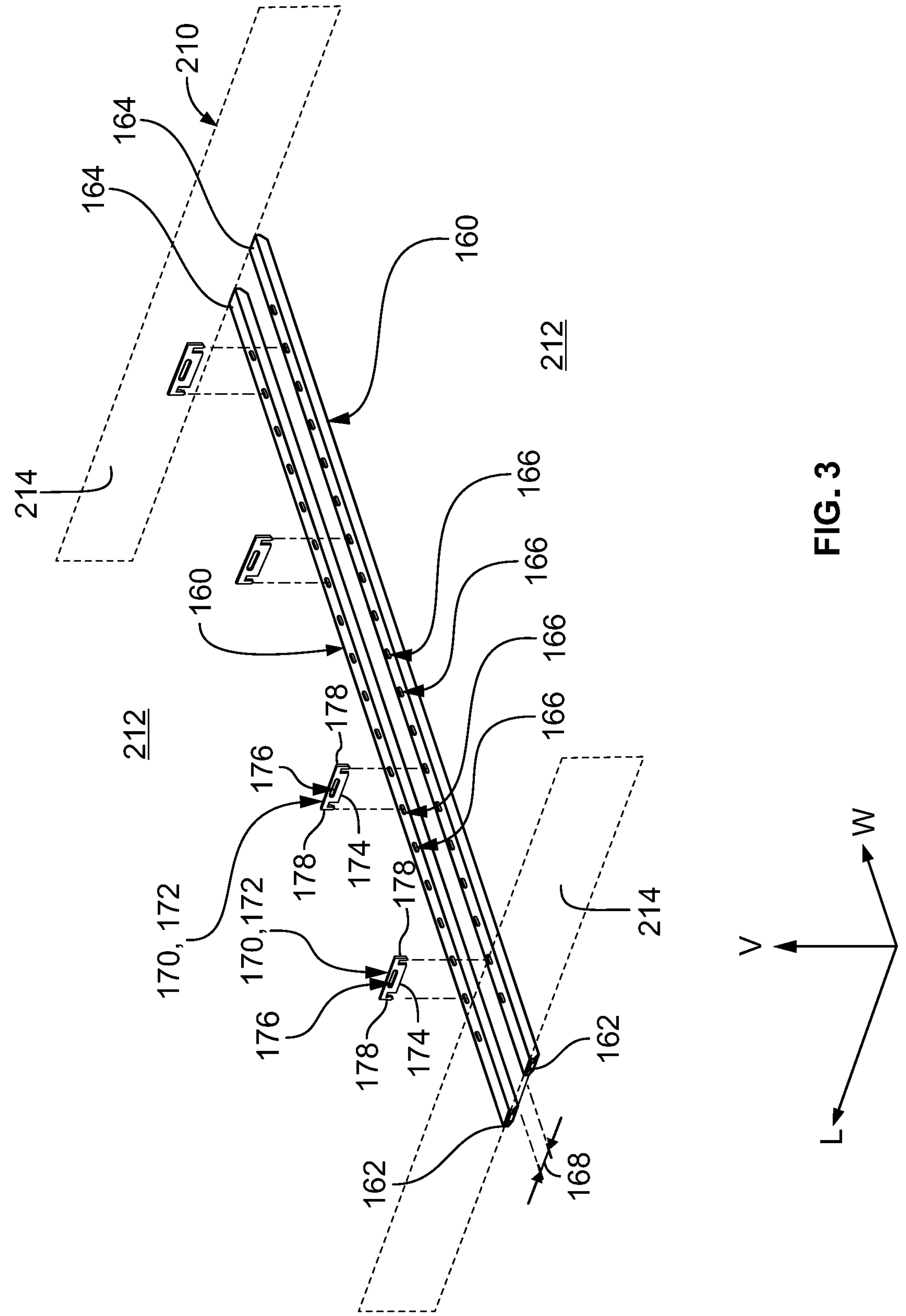
FIG. 3 is a perspective view of a pair of base track members of the bulkhead system on the concrete casting bed.

Each of the base track members 160, as shown in FIG. 3, has an elongated shape extending between a first base end 162 and a second base end 164 along the width direction W. The base track members 160 each have a plurality of base key slots 166 extending through the base track member 160 in the vertical direction V. In the shown embodiments, each of the base key slots 166 has an approximately oval shape. In other embodiments, the base key slots 166 may have other shapes provided they can serve the functions and receive the elements described in detail below.

Figure 6:
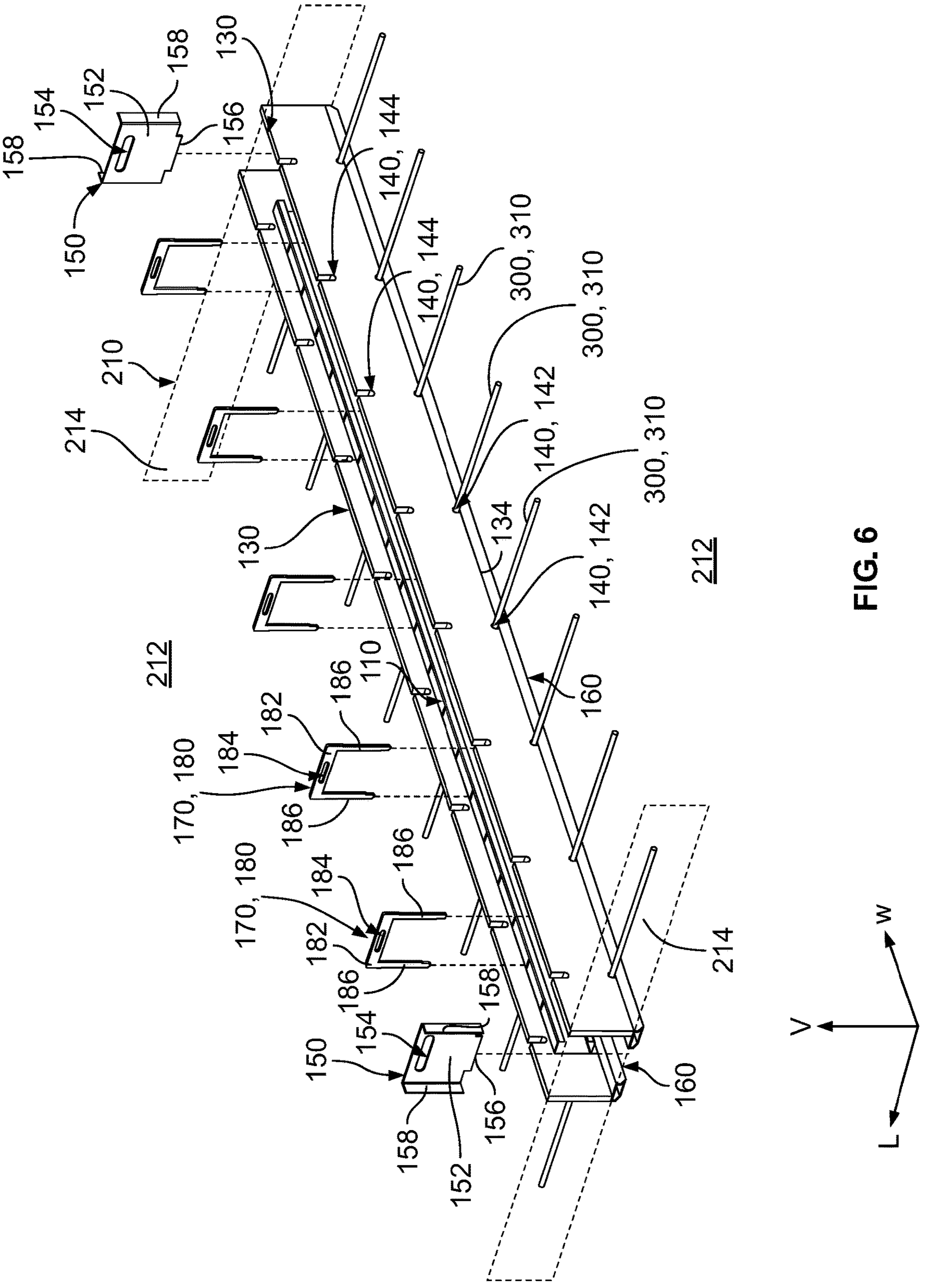
FIG. 6 is a perspective view of the bulkhead system with the first tendons on the concrete casting bed after positioning the form walls on the base track members.

The keys 170 include a plurality of base keys 172, shown in FIG. 3, and a plurality of support keys 180, shown in FIGS. 1 and 6.

As shown in FIG. 3, each of the base keys 172 has a base key body 174 and a pair of base key arms 178 extending from the base key body 174. The base key body 174, in the shown embodiment, has a base key opening 176 extending through the base key body 174. In other embodiments, the base key opening 176 can be omitted and the base key body 174 can be a solid member. A plane defined by the base key body 174 extends along the vertical direction V and a longitudinal direction L perpendicular to the vertical direction V and the width direction W. Each of the base key arms 178 extends from the base key body 174 and has a portion extending in the vertical direction V. In the shown embodiment, the base key arms 178 do not extend beyond the base key body 174 in the vertical direction V. In the shown embodiment, each of the base key arms 178 is L-shaped.

Each of the support keys 180, as shown in FIG. 6, has a support key body 182 and a pair of support key arms 186 extending from the support key body 182. The support key body 182, in the shown embodiment, has a support key opening 184 extending through the support key body 182. In other embodiments, the support key opening 184 can be omitted and the support key body 182 can be a solid member. A plane defined by the support key body 182 extends along the vertical direction V and the longitudinal direction L. Each of the support key arms 186 extends from the support key body 182 in the vertical direction V.

The end panels 150, as shown in FIG. 6, have a panel body 152, a panel protrusion 156 projecting from the panel body 152 in the vertical direction V, and a pair of panel flanges 158 extending from opposite sides of the panel body 152 in the width direction W. The panel body 152, in the shown embodiment, has a panel body opening 154 extending through the panel body 152. In other embodiments, the panel body opening 154 can be omitted and the panel body 152 can be a solid member. A plane defined by the panel body 152 extends along the vertical direction V and the longitudinal direction L. As shown in FIG. 6, the panel protrusion 156 has a dimension smaller than the panel body 152 along the longitudinal direction L. Each of the panel flanges 158 is bent to extend perpendicularly from the panel body 152; the panel flanges 158 extend parallel to one another beyond a side of the panel body 152 and face each other.

The components of the bulkhead system 100, including the support members 110, the form walls 130, the base track members 160, the keys 170, and the end panels 150, can be formed of a range of different materials, including wood, plywood, plastic, any type of resin, or metal. In the shown embodiment, each of the support members 110, the form walls 130, the base track members 160, the keys 170, and the end panels 150 are monolithically formed in a single piece. In other embodiments, any or all of the support members 110, the form walls 130, the base track members 160, the keys 170, and the end panels 150 can have a number of components that are assembled together to form the elements described herein.

A process of assembling and using the bulkhead system 100 to form the concrete casting bed assembly 200 will now be described in greater detail.

The bulkhead system 100 can be used to divide sections of a concrete casting bed 210 shown in FIG. 1 to cast concrete panels or members in the concrete casing bed assembly 200. The concrete casting bed 210 has a bed surface 212 and a pair of bed walls 214 extending perpendicularly from the bed surface 212 in the vertical direction V. The bed walls 214 extend along the longitudinal direction L and are parallel to one another. The bed walls 214 of the concrete casting bed 210 are shown in dashed lines in the figures for clarity of the drawings to avoid obscuring portions of the bulkhead system 100.

Figure 5:
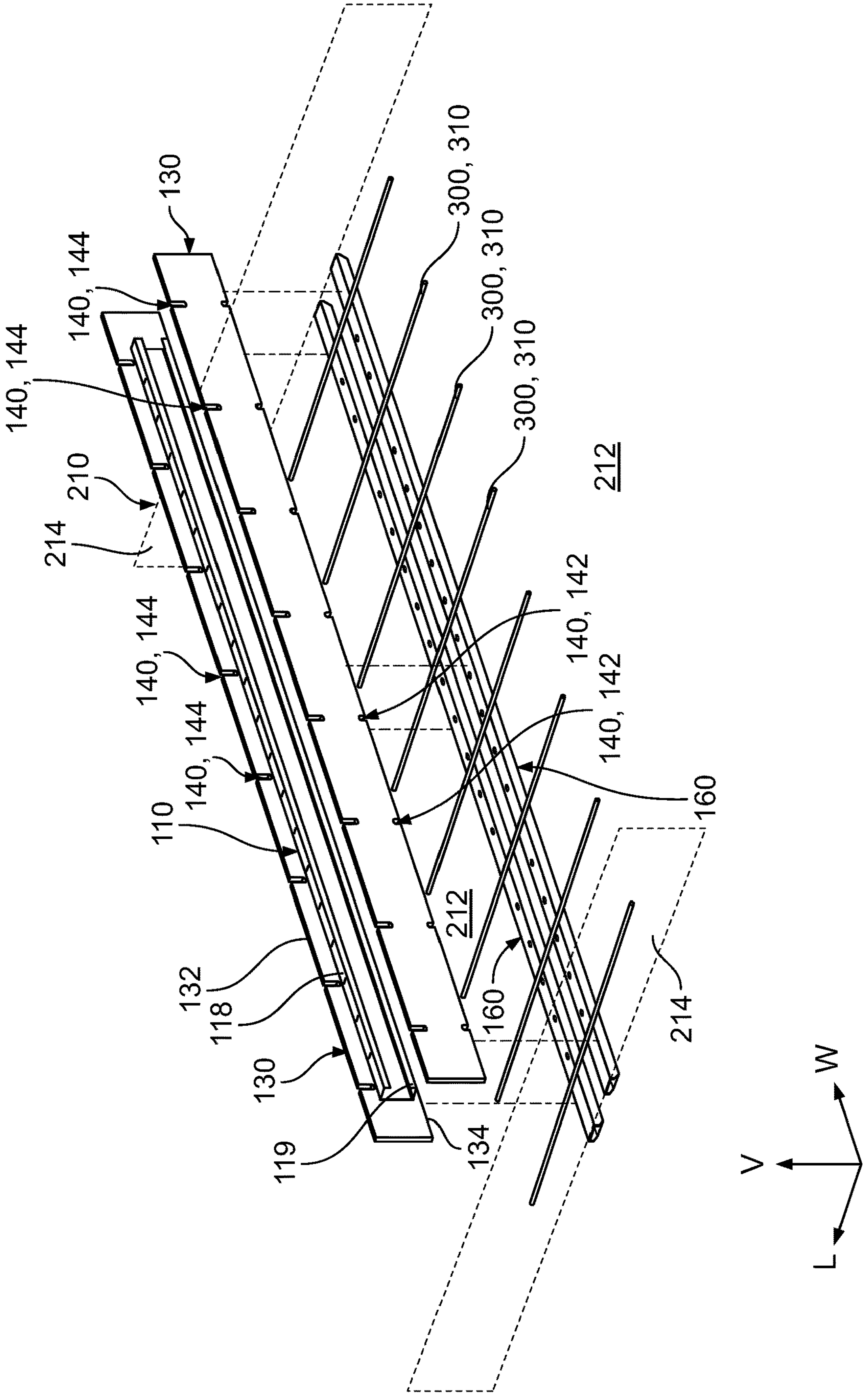
FIG. 5 is a perspective view of the bulkhead system with the first tendons on the concrete casting bed prior to positioning the form walls on the base track members.

In a first step, the form walls 130 are attached to the support members 110. A side of each of the form walls 130 is attached to the support body 112 of one of the support members 110 by a fastener 146, as shown in FIG. 2. In various embodiments, the fastener 146 can be an adhesive or a fastening device, such as a screw. Each of the form walls 130 is attached to the support body 112 of one of the support members 110, as shown in FIG. 5, with the upper end 132 of the form wall 130 extending beyond the upper support portion 118 of the support member 110 in the vertical direction V and the lower end 134 of the form wall 130 extending beyond the lower support portion 119 in the vertical direction V. In a position in which the form wall 130 is attached to the support member 110, the tendon slots 140 are not obscured or covered by any portion of the support member 110.

In an embodiment, each of the form walls 130 can be attached to one of the support members 110 as shown in FIG. 5 prior to a first use and assembly of the bulkhead system

100, and the form walls 130 can remain attached to the support members 110 throughout subsequent dis-assemblies and re-assemblies of the bulkhead system 100 described in detail below. In another embodiment, the form walls 130 can also be disassembled from the support members 110 and reassembled each time the bulkhead system 110 is disassembled and reassembled.

As shown in FIG. 3, the base track members 160 are then positioned on the bed surface 212 of the concrete casting bed 210, extending along the width direction W between the bed walls 214. The base track members 160 are positioned on the bed surface 212 spaced apart from one another along the longitudinal direction L by a base track distance 168.

Figure 4:
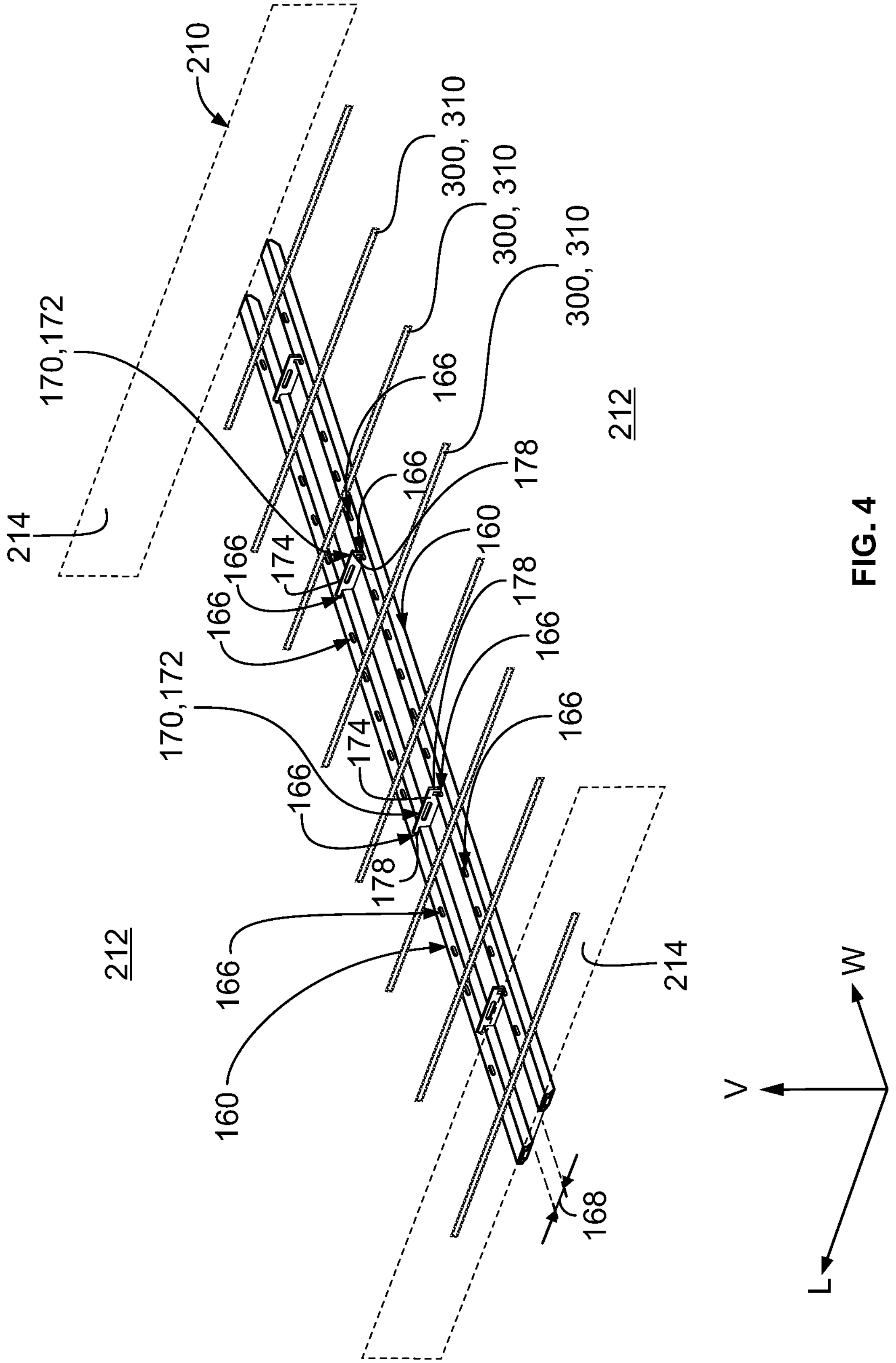
FIG. 4 is a perspective view of the base track members on the concrete casting bed with a plurality of first tendons.

With the base track members 160 positioned on the bed surface 212, the base keys 172 of the keys 170 are inserted into the base track members 160 as shown in FIG. 4. Each of the base key arms 178 is removably disposed in one of the base key slots 166 of one of the base track members 160. The base key body 174 of each of the base keys 172 extends between the base track members 160 along the longitudinal direction L. The base key 172 is removably disposed in the base track members 160 and secures the base track members 160 in the position spaced at the base track distance 168. In the shown embodiment, four base keys 172 are inserted into the base track members 160, and may be inserted in a number of different positions along the width direction W between a number of different pairs of base key slots 166. In other embodiments, less than four or five or more base keys 172 can be removably inserted into the base track members 160 in various positions along the width direction W.

As shown in FIG. 4, with the base track members 160 positioned and held by the base keys 172, a plurality of first tendons 310 of a plurality of tendons 300 are extended or pulled from one end of the concrete casing bed 210 to the other along the longitudinal direction L over the base track members 160. The plurality of first tendons 310 are properly tensioned in the position shown in FIG. 4. Following tensioning of the first tendons 310, the base keys 172 can be removed from the base track members 160 as shown in FIG. 5. In another embodiment, the base keys 172 can remain disposed in the base track members 160 through the subsequent assembly steps.

Following the tensioning of the first tendons 310, the form walls 130 attached to the support members 110, as shown in FIG. 5, are positioned on the base track members 160 as shown in FIG. 6. The lower end 134 of each of the form walls 130 is positioned to abut one of the base track members 160. The form walls 130 are positioned on the base track members 160 with the first tendons 310 each arranged in and extend through one of the first tendon slots 142 of each of the form walls 130.

With the form walls 130 positioned on the base track members 160 as shown in FIG. 6, the support keys 180 are inserted through the support members 110 and into the base track members 160, as shown in FIGS. 1 and 7. One of the form walls 130, the support member 110 attached to one of the form walls 130, and the first tendons 310 are omitted in FIG. 7 for clarity of the insertion of the support key 180.

Each of the support keys 180 is inserted along the vertical direction V and, as shown in FIG. 7, each of the support key arms 186 extends through the support key slots 120 in the upper support portion 118 and the lower support portion 119 of one of the support members 110, and into one of the base key slots 166 of one of the base track members 160. The support key body 182 of each of the support keys 180 extends between the support members 110 and between the form walls 130 along the longitudinal direction L. In the embodiment shown in FIG. 1, five support keys 180 are inserted into the support members 110 and the base track members 160, and may be inserted in a number of different positions along the width direction W between a number of different pairs of support key slots 120 and base key slots 166. In other embodiments, less than five or six or more support keys 180 can be removably inserted into the support members 110 and the base track members 160 in various positions along the width direction W.

The support keys 180 are removably disposed in the support members 110 and the base track members 160 and removably attach the support members 110 and the form walls 130 to the base track members 160 in the position of the support keys 180 shown in FIGS. 1 and 7. The support keys 180 also support the form walls 130 and the support members 110 attached to the form walls 130 to remain in an upright position, further providing bracing support preventing the form walls 130 and support members 110 from caving inward or moving toward each other along the longitudinal direction L.

Figure 9:
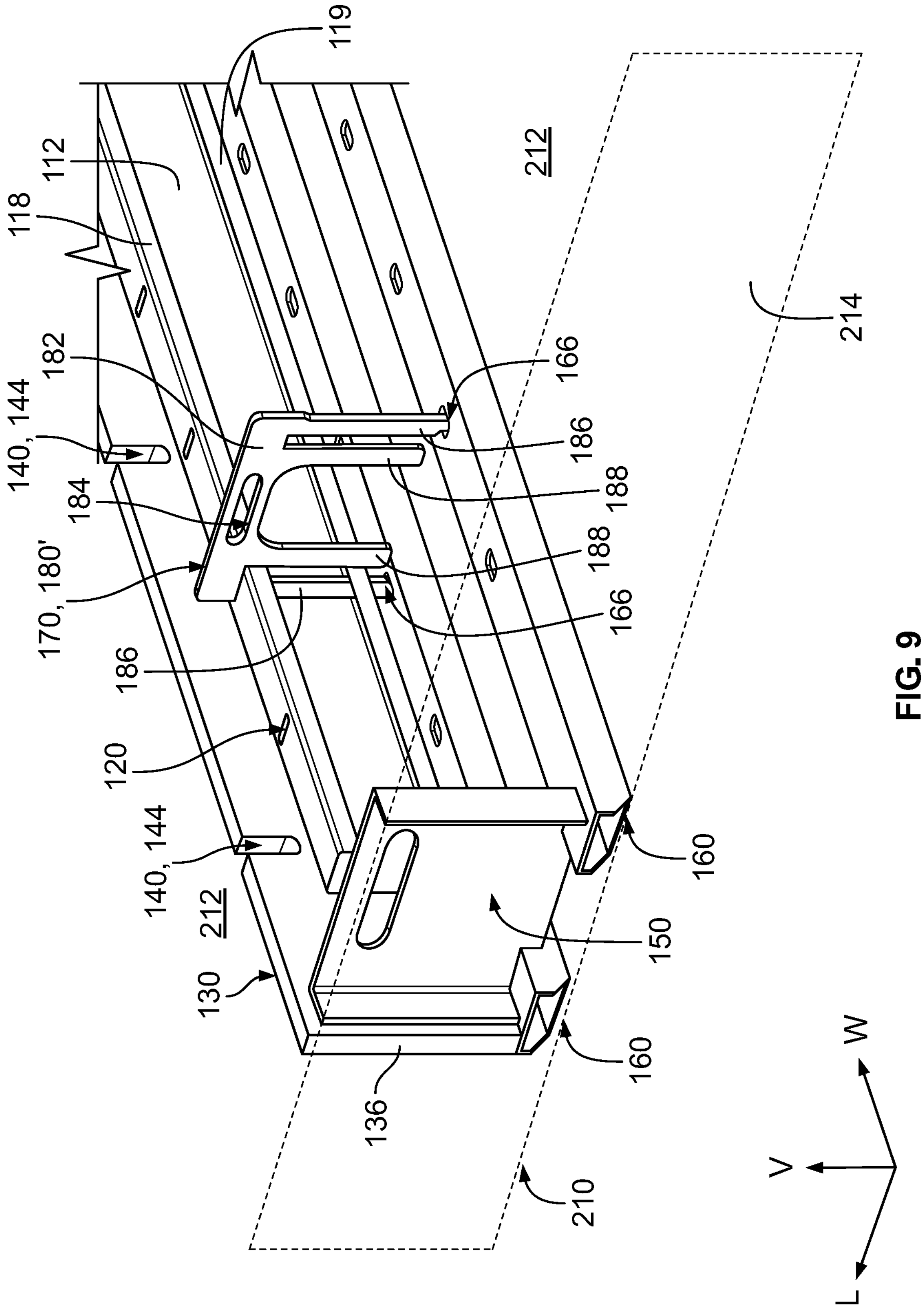
FIG. 9 is a detail perspective view of a support key according to another embodiment inserted through the support member and into the base track members.

Another embodiment of the support keys 180' is shown in FIG. 9. Like reference numbers refer to like elements with a like function, and only the differences of the support key 180' from the embodiment of the support key 180 described with respect to FIGS. 6 and 7 will be described in detail herein. In the embodiment of FIG. 9, the support keys 180' each additionally have a pair of support key posts 188 extending from the support key body 182 in the vertical direction V. Each of the support key posts 188 extends parallel in the vertical direction V, adjacent to, and spaced apart in the longitudinal direction L from one of the support key arms 186.

When the support key 180' in the embodiment of FIG. 9 is inserted in the vertical direction V, as similarly described above, each of the support key arms 186 extends through the support key slots 120 in the upper support portion 118 and the lower support portion 119 of one of the support members 110, and into one of the base key slots 166 of one of the base track members 160. Each of the support key posts 188 extends along an inner side of the upper support portion 118 and the lower support portion 119 and abuts each of the upper support portion 118 and the lower support portion 119. The upper support portion 118 and the lower support portion 119 are secured between the support key arms 186 and the support key posts 188, providing additional holding stability.

In the embodiment shown in FIGS. 1 and 7, the end panels 150 are also positioned between the form walls 130 and the base track members 160 at the first form ends 136 and the second form ends 138 of the form walls 130. The panel protrusion 156 is dimensioned to match the base track distance 168 and fits between the base track members 160 along the longitudinal direction L. Each of the panel flanges 158 abuts an inner side of one of the form walls 130 and the panel body 152 extends along the longitudinal direction L between the form walls 130, providing additional stability to the form walls 130. In another embodiment, the end panels 150 can be omitted.

As shown in FIG. 1, with the form walls 130 and the support members 110 positioned and held by the support keys 180 of the keys 170 and optionally also the end panels 150, a plurality of second tendons 320 of the plurality of tendons 300 are extended or pulled from one end of the concrete casting bed 210 to the other along the longitudinal direction L and over the form walls 130. The second tendons 320 are each arranged in and extend through one of the second tendon slots 144 of each of the form walls 130. The second tendons 120 are properly tensioned in the position shown in FIG. 1.

Figure 8:
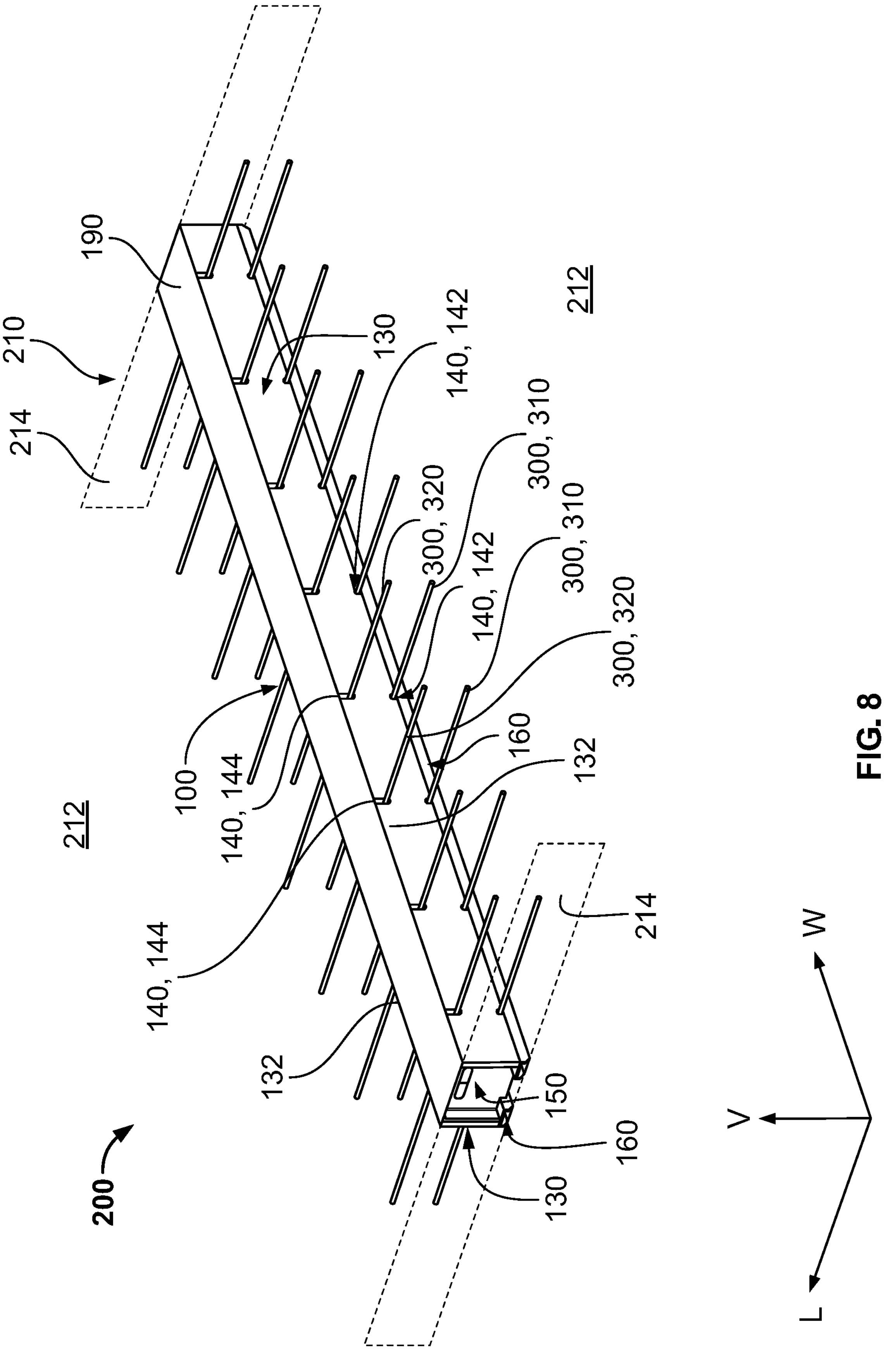
FIG. 8 is a perspective view of the bulkhead system on the concrete casting bed with a top panel.

In an embodiment, as shown in FIG. 8, the bulkhead assembly 100 can include a top panel 190. The top panel 190 is disposed on the upper end 132 of each of the form walls 130 with the first tendons 310 positioned in the first tendon slots 142 and the second tendons 320 positioned in the second tendon slots 144. In another embodiment, the top panel 190 can be omitted.

With the bulkhead system 100 assembled on the concrete casting bed 210 to form the concrete casting bed assembly 200, as shown in FIGS. 1 and 8, concrete panels can be cast within the concrete casting bed assembly 200. Concrete is poured into the concrete casting bed 210 onto the bed surface 212 and between the bed walls 214. The bulkhead system 100 separates sections of the concrete casting bed 210 along the longitudinal direction L that are used to form adjacent and separate concrete panels; multiple bulkhead systems 100 can be installed along the concrete casting bed 210 depending on the desired number and size of the concrete panels. After the concrete cures around the tendons 300 to a sufficient strength, the keys 170 are removed, after removal of the top panel 190 in an embodiment, and the tendons 300 are de-tensioned. The tendons 300 are cut between the form walls 130, and the concrete panels can be removed from the concrete casting bed assembly 200 for use.

The bulkhead system 100 can then be disassembled for re-use in further casting applications. With the keys 170 removed, the end panels 150 are removed from between the form walls 130, and the form walls 130 attached to the support members 110 are lifted off the base track members 160. The base track members 160 are then removed from the bed surface 212. Following disassembly, the bulkhead system 100 can then be later re-assembled on the concrete casting bed 210 to form the concrete casting bed assembly 200 as described in detail above for subsequent casting of additional concrete panels.

The removable attachments of the components of the bulkhead system 100 allow for easy and quick assembly and disassembly of the bulkhead system 100 on the concrete casting bed 210 without the use of separate tools, reducing labor costs and increasing production capacity by reducing downtime. The components of the bulkhead system 100 are also re-usable, reducing material cost. Further, the placement of the tendons 300 within the tendon slots 140 and the assembly of the bulkhead system 100 around the tendons 300 allows the tendons 300 to be pulled along the length of the concrete casting bed 210 without requiring a worker to individually thread the tendons through each bulkhead, reducing the time required to position the tendons 300 and the likelihood of worker injury.

What is claimed is:

1. A bulkhead system for a concrete casting bed, comprising:

a pair of base track members spaced apart from one another along a longitudinal direction; and a pair of form walls each removably attached to one of the base track members, each of the form walls has a lower end abutting one of the base track members and an upper end opposite the lower end in a vertical direction perpendicular to the longitudinal direction, each of the form walls has a tendon slot extending into the form wall in the vertical direction from at least one of the upper end and the lower end, the tendon slot receives a tendon extending in the longitudinal direction.

2. The bulkhead system of claim 1, wherein the tendon slot is one of a plurality of tendon slots in each of the form walls, the plurality of tendon slots in each of the form walls include a first tendon slot extending into the form wall in the vertical direction from the lower end and a second tendon slot extending into the form wall in the vertical direction from the upper end.

3. The bulkhead system of claim 2, wherein the first tendon slot receives a first tendon extending along the longitudinal direction and the second tendon slot receives a second tendon extending along the longitudinal direction.

4. The bulkhead system of claim 2, wherein the first tendon slot is aligned with the second tendon slot along the vertical direction.

5. The bulkhead system of claim 1, further comprising a base key having a pair of base key arms, each of the base key arms is disposed in a base key slot of one of the base track members, the base key extends between the base track members along the longitudinal direction.

6. The bulkhead system of claim 1, further comprising a pair of support members, each of the form walls is attached to one of the support members.

7. The bulkhead system of claim 6, further comprising a support key removably disposed in the support members and extending between the support members along the longitudinal direction.

8. The bulkhead system of claim 7, wherein each of the support members has a support body attached to one of the form walls, an upper support portion extending from the support body, a lower support portion extending from the support body, and a plurality of support key slots extending through the support member in the vertical direction.

9. The bulkhead system of claim 8, wherein the support key has a support key body and a pair of support key arms extending from the support key body.

10. The bulkhead system of claim 9, wherein each of the support key arms extends through the upper support portion and the lower support portion of one of the support members and into one of the base track members.

11. The bulkhead system of claim 1, further comprising a pair of end panels, the end panels are disposed between the form walls and the base track members at a pair of ends of the form walls and the base track members opposite one another in a width direction perpendicular to the longitudinal direction and the vertical direction.

12. The bulkhead system of claim 1, further comprising a top panel disposed on the upper end of each of the form walls.

13. A method of forming a concrete casting bed assembly, comprising:

positioning a pair of base track members on a bed surface of a concrete casting bed between a pair of bed walls of the concrete casting bed, the base track members are spaced apart from one another along a longitudinal direction of the concrete casting bed;

attaching a pair of form walls to the base track members, each of the form walls is removably attached to one of the base track members, each of the form walls has a lower end abutting one of the base track members and an upper end opposite the lower end in a vertical direction perpendicular to the longitudinal direction, each of the form walls has a tendon slot extending into the form wall in the vertical direction from at least one of the upper end and the lower end; and arranging a tendon extending in the longitudinal direction in the tendon slot.

14. The method of claim 13, wherein the tendon is a first tendon and further comprising extending the first tendon along the concrete casting bed in the longitudinal direction, the extending step of the first tendon occurs before the attaching step and the arranging step.

15. The method of claim 14, wherein the tendon slot of each of the form walls is a first tendon slot extending into the form wall in the vertical direction from the lower end, the first tendon is arranged in the first tendon slot between the form walls and the base track members.

16. The method of claim 15, further comprising extending a second tendon along the concrete casting bed in the longitudinal direction, the extending step of the second tendon occurs after the attaching step.

17. The method of claim 16, wherein each of the form walls has a second tendon slot extending into the form wall in the vertical direction from the upper end, the second tendon is arranged in the second tendon slot.

18. The method of claim 13, further comprising inserting a base key into the base track members, the base key is removably disposed in the base track members and spaces the base track members apart along the longitudinal direction.

19. The method of claim 13, further comprising attaching each of the form walls to one of a pair of support members.

20. The method of claim 19, further comprising inserting a support key through the support members and into the base track members, the support key is removably disposable in the support members to connect the support members to the base track members.

* * * * *